Aug. 7, 1945.　　　　L. W. YOUNG　　　　2,381,633
LOCK AND FASTENING DEVICE
Filed Oct. 15, 1942
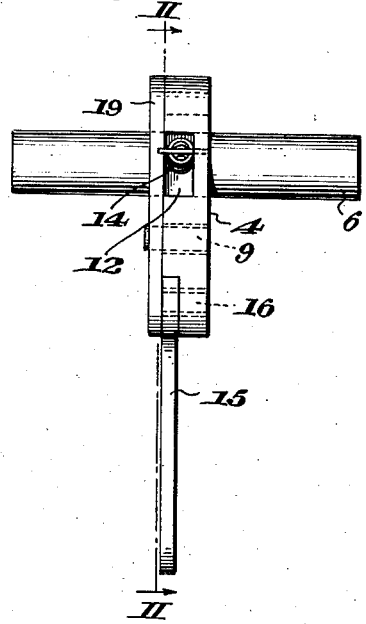
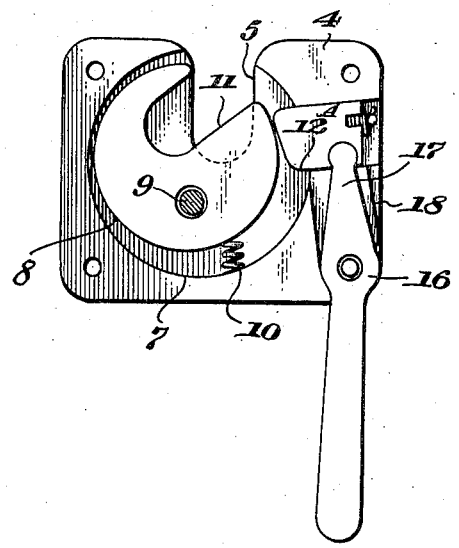
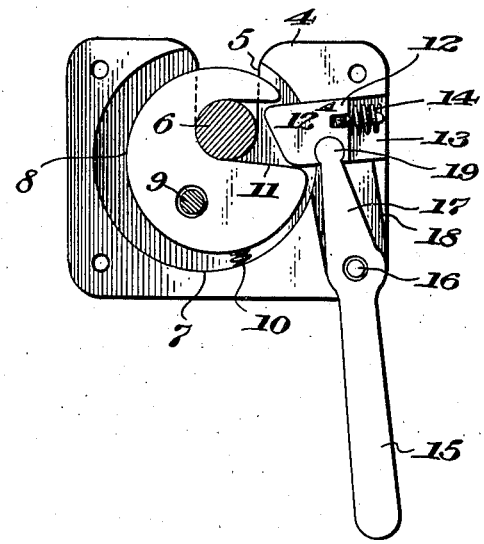
Inventor
Leonard W. Young
By
Attorney Patented Aug. 7, 1945

2,381,633

UNITED STATES PATENT OFFICE 2,381,633

LOCK AND FASTENING DEVICE

Leonard Weare Young, Northwood, England

Application October 15, 1942, Serial No. 462,151
In Great Britain October 15, 1941

4 Claims. (Cl. 292—340)

This invention relates to an improved lock or fastening device, which for convenience in the ensuing description will be referred to as a "latch."

In a latch according to the present invention a bolt, projection or like member to be secured (for convenience hereinafter referred to as a "bolt") is engageable by a slot in a cam plate rotatable on a base under the influence of the entering bolt, the cam plate being engaged by a releasable catch operable to secure the cam plate in such a position that its slot prevents withdrawal of the bolt.

The invention has a particular embodiment in a device for fastening a cowling, panel or hatch on an aircraft.

In order that it may be clearly understood and readily carried into effect, the invention is hereinafter described with reference to the accompanying diagrammatic drawing, of which:

Figure 1 is an end elevation of a latch showing a bolt engaged thereby;

Figure 2 is a section taken on the line II—II of Figure 1; while

Figure 3 is a view similar to Figure 2 but showing the latch in its disengaged condition.

The latch includes a base part 4 which has a slot 5 leading into it from one edge. The slot 5 is intended to receive the bolt 6. The arrangement will generally be such that the base plate is screwed or otherwise secured to a frame member surrounding the movable cowling, panel, hatch or door, whereas the bolt 6 is provided on the hinged or other movable member which fits the surrounding framework; and it will be understood that the slot 5 needs to be so disposed that the bolt 6 enters the slot as the hinged or movable member is closed. The base has formed in it a recess 7, within which there is mounted a flat cam plate 8 which is secured by and turns about the pivot 9. The pivot 9 is eccentric both in relation to the cam plate 8 and the recess 7, and the cam plate 8 is thus free to swing about the pivot 9 within the limits defined by the recess. The cam plate 8 is urged by the small coil spring 10 to the limit of its anticlockwise movement about the pivot 9, which position is of course determined by engagement of the cam with the lefthand side of the recess 7. In that setting a slot 11 in the cam plate 8 has its open end in register with the slot 5 of the base. The parts are so shown in Figure 3, which illustrate the lock in the disengaged condition ready for the reception of a bolt such as 6.

When the bolt 6 enters the slot 5 it eventually engages the righthand edge of the slot 11 of the cam plate, which thus serves to overcome the force of the spring 10 and to turn the cam plate 8 clockwise about the pivot 9 into the position shown in Figure 2. For locking the latch in the position shown in Figure 2, with the bolt fully engaged, there is provided a slidable catch 12 which is guided in the slot 13, and which is urged inwardly by the spring 14. The spring 14 causes the nose of the catch 12 to bear on the end of the cam; and consequently it follows that the catch 12 snaps into the slot 11 immediately it comes, during clockwise rotation of the cam plate 8, into register with the catch.

For disengagement of the latch, it suffices to release the catch 12, which is urged outwardly against the pressure of the spring 14 by manipulation of the handle 15, which swings about the pivot 16 on the base plate 4. The handle 15 continues inwardly as the catch-actuating lever 17, which can be moved angularly within the limits defined by the slot 18. At its inner end the lever 17 has a circular end portion 19 which fits a complementary slot formed in the edge of the catch 12. On release of the catch 12 from the slot 11 of the cam plate 8 the spring 10 tends to rotate the cam plate anticlockwise and thereby to disengage the latch, urging the bolt 6 outwardly.

It will be observed that the slot 11 acts as the equivalent of a combined striker and locking jaw. Thus, the striker is the righthand edge of the slot 11 which is engaged by the bolt 6 as the bolt enters the slot 5 with the parts in the position shown in Figure 3. Continuing the analogy, the lefthand edge of the slot 11 comprises the locking jaw which lies transversely across the slot 5 to hold the bolt 6 down at the bottom of the slot 5, as shown in Figure 2.

It is contemplated that the handle 15 may be actuated by any convenient form of remote control cable.

A manufacturing point which is worthy of mention is that for the best results the angle of engagement between the edge 12A of the catch 12 and the righthand or striker edge of the slot 11 of the cam plate is fairly critical. Thus, in the fully-engaged position as shown in Figure 2 the edge 12A should be inclined to the righthand or striker edge of the slot 11 at an angle of approximately 10°. If that angle is very much less than 10° the latch is difficult to release under load; while, conversely, a greater angle tends to permit the latch to release itself under heavy loads. It is also preferable that the inner end of the catch 12 should not abut the bolt 6 in the fully-engaged condition of the latch, for if it does slight wear will make the parts slack.

It is an important feature of the latch device according to the present invention that, due to the angle at which the catch 12 operates, the bolt is actually securely gripped by the cam plate, with the result that rattle is prevented and any vibration which occurs between the bolt and the latch device results in the bolt being gripped the more tightly.

The spring 10 can be sufficiently strong to cause ejection of the bolt 6 on release of the catch.

The latch device can be easily adapted for ordinary household doors, and is eminently suitable for automobile doors, bonnet catches, et cetera.

The plate indicated in Figure 1 by reference numeral 19 is merely a cover plate which is bolted to the base plate. Though in all cases the cover plate is preferable, it may be dispensed with if the base plate is to be outermost when the latch is mounted.

What I claim is:

1. A latch device for securely engaging a bolt engageable with and disengageable from the latch, comprising a base plate having a recess and provided with a slot leading in from an edge and communicating with said recess for the reception of the engageable bolt; a cam plate eccentrically mounted for rotation in the recess of said base plate; a slot leading in from an edge of said rotatable cam plate; the cam plate by engagement with the wall of said recess serving to define a limit position in rotation of said cam plate, in which limit position the open end of the cam slot is in register with the slot of the base plate to receive the entering bolt; and releasable catch means engageable with the slot of said cam plate to secure it with its slot lying across the base plate slot to close the latter and prevent withdrawal of the bolt.

2. A bolt latch, including a base formed with a recess having an edge wall and formed with an entering slot, a cam plate formed with a corresponding slot and mounted for eccentric movement in the recess to provide a latch-open position with the slots in registry and a latch-closed position with the slots out of registry, the cam plate being limited in movement to latch-open position by contact with a part of the wall of the base recess, a spring bearing between the wall of the recess and the cam plate to move the latter when free into that contact with the wall of the recess to normally maintain the cam plate in latch-open position, and a member movable in the base to enter the slot in the cam plate when the latter is in latch-closing position, said member when in said slot holding the spring under compression for automatically moving the cam plate to latch-open position when the member has been withdrawn from the slot.

3. A bolt latch, including a base formed with a recess having an edge wall and formed with an entering slot, a cam plate formed with a corresponding slot and mounted for eccentric movement in the recess to provide a latch-open position with the slots in registry and a latch-closed position with the slots out of registry, the cam plate being limited in movement to latch-open position by contact with a part of the wall of the base recess, a spring bearing between the wall of the recess and the cam plate to move the latter when free into that contact with the wall of the recess to normally maintain the cam plate in latch-open position, and a member movable in the base to automatically enter the slot in the cam plate when the latter is in latch-closing position, said member when in said slot holding the spring under compression for automatically moving the cam plate to latch-open position when the member has been withdrawn from the slot.

4. A bolt latch, including a base formed with a recess having an edge wall and formed with an entering slot, a cam plate formed with a corresponding slot and mounted for eccentric movement in the recess to provide a latch-open position with the slots in registry and a latch-closed position with the slots out of registry, the cam plate being limited in movement to latch-open position by contact with a part of the wall of the base recess, a spring bearing between the wall of the recess and the cam plate to move the latter when free into that contact with the wall of the recess to normally maintain the cam plate in latch-open position, a member movable in the base to automatically enter the slot in the cam plate when the latter is in latch-closing position, said member when in said slot holding the spring under compression for automatically moving the cam plate to latch-open position when the member has been withdrawn from the slot, and means for withdrawing the member from the slot to a position to bear on and exert pressure against the edge of the cam plate in all non-latch-closing positions of said plate.

LEONARD WEARE YOUNG.